(12) United States Patent
Bevan et al.

(10) Patent No.: US 10,023,194 B2
(45) Date of Patent: Jul. 17, 2018

(54) METHOD AND SYSTEM FOR CONTROLLING A VEHICLE POWERTRAIN

(71) Applicant: JAGUAR LAND ROVER LIMITED, Warwickshire (GB)

(72) Inventors: Neil Bevan, Coventry (GB); Robin Maugham, Coventry (GB); Andrew Lilley, Coventry (GB); Simon Jarvis, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 289 days.

(21) Appl. No.: 14/903,310

(22) PCT Filed: Jul. 3, 2014

(86) PCT No.: PCT/EP2014/064180
§ 371 (c)(1),
(2) Date: Jan. 7, 2016

(87) PCT Pub. No.: WO2015/003992
PCT Pub. Date: Jan. 15, 2015

(65) Prior Publication Data
US 2016/0144862 A1 May 26, 2016

(30) Foreign Application Priority Data
Jul. 8, 2013 (GB) .................................. 1312212.2

(51) Int. Cl.
*B60W 10/04* (2006.01)
*B60W 10/10* (2012.01)
(Continued)

(52) U.S. Cl.
CPC .......... *B60W 30/188* (2013.01); *B60W 10/04* (2013.01); *B60W 10/10* (2013.01);
(Continued)

(58) Field of Classification Search
CPC .... B60W 10/04; B60W 10/10; B60W 30/188; B60W 30/1882; B60W 50/0205;
(Continued)

(56) References Cited

U.S. PATENT DOCUMENTS 7,107,134 B1 9/2006 Melby et al.
2002/0183911 A1 12/2002 Tashiro et al.
(Continued)

FOREIGN PATENT DOCUMENTS

EP 2463504 A1 6/2012
GB 2370867 A 7/2002
(Continued)

OTHER PUBLICATIONS

Combined Search and Evaluation Report under Sections 17 and 18(3) for Application No. GB1312212.2 dated Jan. 20, 2014.
(Continued)

*Primary Examiner* — Edwin Young
(74) *Attorney, Agent, or Firm* — Carlson, Gaskey & Olds (57) ABSTRACT

The invention relates to a method of controlling a vehicle powertrain including determining that a performance feature associated with the powertrain is outside of a desired performance range. A plurality of operation parameters that are associated with the powertrain are identified that have a relationship to the performance feature. An adjustment is automatically made to at least one of the identified operation parameters to thereby bring the performance feature closer to the desired performance range. Preferably, the relationship comprises a mathematical model that corresponds to how the operation parameters influence whether the performance feature is within the desired performance range, the method further comprising identifying an actuator failure associated with the powertrain; determining at least one of the operation parameters corresponding to the actuator fail-
(Continued)

ure; determining a value of the corresponding operation parameter that is indicative of the actuator failure; and using the determined value as a fixed value for the corresponding operation parameter in the mathematical model.

17 Claims, 5 Drawing Sheets (51) Int. Cl.
| | |
|---|---|
| *B60W 30/188* | (2012.01) |
| *B60W 50/029* | (2012.01) |
| *F02D 41/14* | (2006.01) |
| *F02D 41/22* | (2006.01) |
| *B60W 30/182* | (2012.01) |
| *B60W 50/02* | (2012.01) |
| *B60W 50/00* | (2006.01) |
| *F02D 41/38* | (2006.01) |
| *F02D 41/00* | (2006.01) |

(52) U.S. Cl.
CPC ...... *B60W 30/182* (2013.01); *B60W 30/1882* (2013.01); *B60W 50/0205* (2013.01); *B60W 50/029* (2013.01); *F02D 41/146* (2013.01); *F02D 41/22* (2013.01); B60W 2050/0014 (2013.01); B60W 2050/0093 (2013.01); B60W 2050/022 (2013.01); B60W 2050/0292 (2013.01); B60W 2540/30 (2013.01); B60Y 2300/472 (2013.01); B60Y 2300/476 (2013.01); B60Y 2400/432 (2013.01); B60Y 2400/442 (2013.01); F02D 41/0055 (2013.01); F02D 41/3836 (2013.01); F02D 2041/227 (2013.01)

(58) Field of Classification Search
CPC ........... B60W 50/0225; B60W 50/035; B60W 2050/022; B60W 2050/0297
See application file for complete search history.

(56) References Cited

U.S. PATENT DOCUMENTS

| | | | |
|---|---|---|---|
| 2008/0172155 A1* | 7/2008 | Takamatsu | B60G 17/0195 701/40 |
| 2009/0076716 A1 | 3/2009 | Han | |
| 2010/0066526 A1 | 3/2010 | Kascha | |
| 2013/0151120 A1 | 6/2013 | Kim | |
| 2013/0244831 A1* | 9/2013 | Hiasa | F16H 61/04 477/79 |
| 2013/0288857 A1* | 10/2013 | Tanaka | B60W 10/04 477/111 |

FOREIGN PATENT DOCUMENTS

| | | |
|---|---|---|
| JP | H09280117 A | 10/1997 |
| JP | 2002285905 A | 10/2002 |
| KR | 20130038500 A | 4/2013 |
| WO | 2006007943 A1 | 1/2006 |

OTHER PUBLICATIONS

International Search Report and Written Opinion of the International Searching Authority for International application No. PCT/EP2014/064180 dated Sep. 29, 2014.

* cited by examiner

METHOD AND SYSTEM FOR CONTROLLING A VEHICLE POWERTRAIN

TECHNICAL FIELD

The subject matter of this description generally relates to vehicle powertrain control. More particularly, but not exclusively, the subject matter of this description relates to adaptively controlling one or more operation parameters of a vehicle powertrain. Aspects of the subject matter of this description relate to a method, a system and a vehicle.

BACKGROUND

There are a variety of regulations concerning various aspects of vehicle operation. For example, some regions have standards concerning exhaust emissions. While many vehicles are designed to comply with such standards, it is possible for situations to arise that interfere with the ability of such vehicles to comply. For example, when an actuator of a vehicle powertrain fails to operate as intended that may alter the vehicle emissions to such an extent that the vehicle is no longer compliant with the applicable standard. Some vehicles include a malfunction indicator that warns the driver that the vehicle is no longer operating in a manner that is compliant with the applicable standard.

When a malfunction indicator is activated, the vehicle owner typically takes the vehicle in for service to have the problem corrected. Once the problem is corrected, the vehicle should be able to once again comply with the standard. At a minimum, this is an inconvenience to the vehicle owner and it is desirable to minimize such an occurrence.

SUMMARY

According to an embodiment, a method of controlling a vehicle powertrain includes determining that a performance feature associated with the powertrain is outside of a desired performance range. A plurality of operation parameters that are associated with the powertrain are identified that have a relationship to the performance feature. An adjustment is automatically made to at least one of the identified operation parameters to thereby bring the performance feature closer to the desired performance range.

An embodiment having one or more features of the method of the previous paragraph includes determining an influence that each identified operation parameter has on the performance feature, and prioritizing adjusting one of the identified operation parameters having a first influence over another identified operation parameter with a second, lower influence.

An embodiment having one or more features of the method of any of the previous paragraphs includes automatically adjusting at least the operation parameter with the highest influence.

An embodiment having one or more features of the method of any of the previous paragraphs includes determining whether a first adjustment to the operation parameter with the highest influence results in the performance feature returning to the desired performance range; and automatically making a second adjustment to the operating parameter with the highest influence if the performance feature is still outside the desired performance range; or automatically adjusting at least one other of the identified operation parameters that is selected according to the prioritizing if the performance feature is still outside the desired performance range.

In an embodiment having one or more features of the method of any of the previous paragraphs, the automatically adjusting comprises implementing an adjustment to at least one of the operation parameters, and determining whether the adjustment causes the performance feature to be within the desired performance range.

An embodiment having one or more features of the method of any of the previous paragraphs includes repeatedly implementing another, different adjustment to at least one of the operation parameters if a most recent adjustment does not cause the performance feature to be within the desired performance range.

In an embodiment having one or more features of the method of any of the previous paragraphs, the relationship comprises a mathematical model that corresponds to how the operation parameters influence whether the performance feature is within the desired performance range.

An embodiment having one or more features of the method of any of the previous paragraphs includes identifying an actuator failure associated with the powertrain, determining at least one of the operation parameters corresponding to the actuator failure, determining a value of the corresponding operation parameter that is indicative of the actuator failure, and using the determined value as a fixed value for the corresponding operation parameter in the mathematical model.

In an embodiment having one or more features of the method of any of the previous paragraphs, the automatically adjusting at least one of the identified operation parameters comprises changing a value of the at least one of the operation parameters in the mathematical model until the performance feature value of the mathematical model is within the desired performance range.

According to an embodiment, a system includes a controller configured to determine that a performance feature associated with a vehicle powertrain is outside of a desired performance range. The controller identifies a plurality of operation parameters associated with the powertrain having a relationship to the performance feature. The controller is also configured to automatically adjust at least one of the identified operation parameters to thereby bring the performance feature closer to the desired performance range.

In an embodiment having one or more features of the system of the previous paragraph, the controller is configured to determine an influence that each identified operation parameter has on the performance feature, and prioritize adjusting one of the identified operation parameters having a first influence over another identified operation parameter with a second, lower influence.

In an embodiment having one or more features of the system of any of the previous paragraphs, the controller is configured to automatically adjust at least the operation parameter with the highest influence.

In an embodiment having one or more features of the system of any of the previous paragraphs the controller is configured to determine whether a first adjustment to the operation parameter with the highest influence results in the performance feature returning to the desired performance range, and automatically make a second adjustment to the operating parameter with the highest influence if the performance feature is still outside the desired performance range, or automatically adjust at least one other of the identified operation parameters that is selected according to the prioritizing if the performance feature is still outside the desired performance range.

In an embodiment having one or more features of the system of any of the previous paragraphs the controller is configured to automatically adjust the at least one of the identified operation parameters by implementing an adjustment to at least one of the operation parameters, and determining whether the adjustment causes the performance feature to be within the desired performance range.

In an embodiment having one or more features of the system of any of the previous paragraphs the controller is configured to repeatedly implement another, different adjustment to at least one of the operation parameters until the performance feature is within the desired performance range.

In an embodiment having one or more features of the system of any of the previous paragraphs the relationship comprises a mathematical model that corresponds to how the operation parameters influence whether the performance feature is within the desired performance range.

In an embodiment having one or more features of the system of any of the previous paragraphs the controller is configured to identify an actuator failure associated with the powertrain, determine at least one of the operation parameters corresponding to the actuator failure, determine a value of the corresponding operation parameter that is indicative of the actuator failure, and use the determined value as a fixed value for the corresponding operation parameter in the mathematical model.

In an embodiment having one or more features of the system of any of the previous paragraphs the controller is configured to automatically adjust at least one of the identified operation parameters by changing a value of the at least one of the operation parameters in the mathematical model until the performance feature value of the mathematical model is within the desired performance range.

According to an embodiment, a vehicle includes the system of any of the preceding paragraphs.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

One or more embodiments of the present invention will now be described, by way of example only, with reference to the accompanying drawings, which can be briefly described as follows.

DETAILED DESCRIPTION

Figure 1:
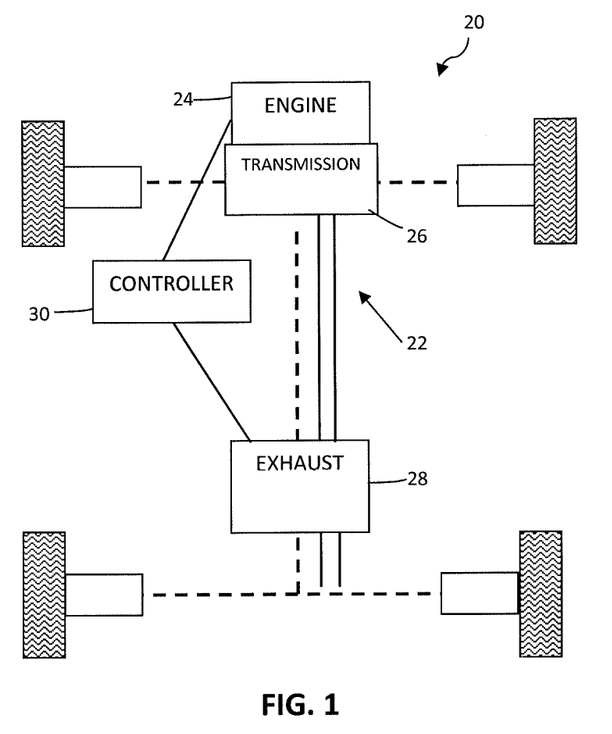
FIG. 1 diagrammatically illustrates selected portions of a vehicle designed according to an embodiment of this invention that includes a system for adaptively controlling the vehicle powertrain.

FIG. 1 schematically illustrates selected portions of a vehicle 20. A powertrain 22 of the vehicle includes various components, such as an engine 24, a transmission 26 and an exhaust 28. Each of the engine 24, transmission 26 and exhaust 28 includes at least one actuator or functional component, which is not illustrated for the sake of simplifying the illustration. Such components or actuators are known and those skilled in the art will understand how they are associated with the vehicle powertrain 22.

The vehicle is intended to perform in a manner that provides a desired level of performance and complies with ordinances or regulations that impose standards on various performance features of the vehicle. For example, the exhaust emissions from the vehicle and noise generated during vehicle operation should comply with relevant standards. The current operation condition and settings of the various actuators and functional components of the powertrain 22 have an impact on whether the performance features are within a desired or acceptable performance range.

The vehicle 20 includes a controller 30 that is configured to adaptively control operation of the powertrain 22 for maintaining the performance features within a desired or acceptable performance range. The controller 30 obtains information that allows the controller 30 to determine the status (e.g., operation condition or functionality and setting) of the various actuators or functional components of the powertrain 22. The controller 30 uses such information to automatically adjust at least one operation parameter that influences the performance features associated with powertrain operation.

Figure 2:
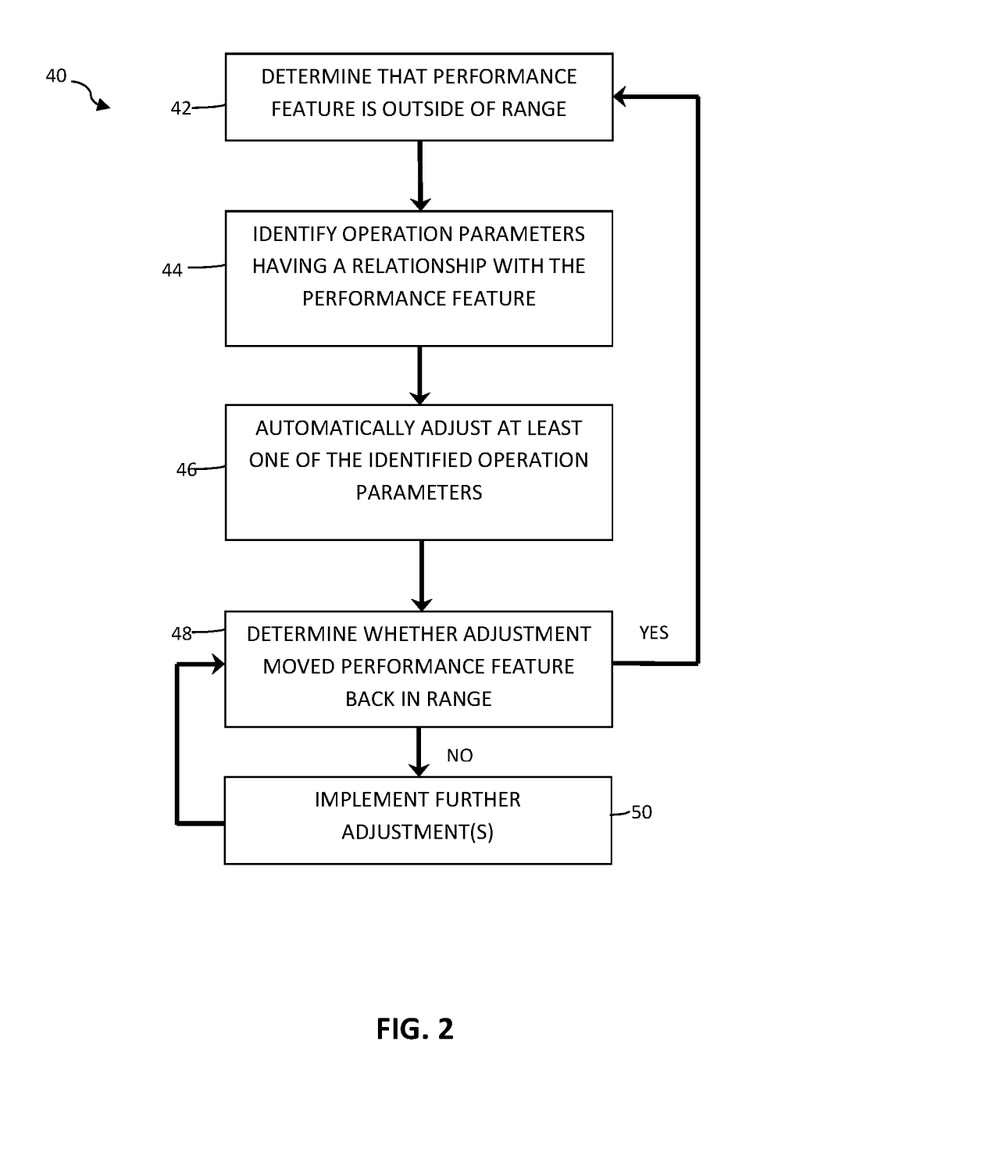
FIG. 2 is a flowchart diagram summarizing an example adaptive powertrain control strategy.

FIG. 2 includes a flow chart diagram 40 that summarizes an example method performed by the controller 30 for adaptively controlling the powertrain 22. At 42, the controller 30 determines that a performance feature associated with the powertrain 22 is outside of an acceptable or desired range. At 44, the controller 30 identifies a plurality of operation parameters that are associated with the actuators or functional components of the powertrain and have a relationship with the performance feature. At 46, the controller 30 automatically implements a change to at least one of the identified operation parameters to bring the performance feature closer to the acceptable or desired range.

In some instances a single adjustment to a single one of the identified operation parameters will rectify the situation and vehicle operation can continue based on the adaptive adjustment to the powertrain 22. In others, more than one of the identified operation parameters will be adjusted as part of an initial attempt to bring the aberrant performance feature back in line. There will be conditions, however, that require more than an initial or single adjustment to the selected operation parameter or combination of parameters to correct an unsatisfactory performance feature. The example of FIG. 2 includes a step at 48 where the controller 30 determines whether the adjustment has corrected the problem. If so, the procedure stops until another performance feature problem is detected at which time the example process is repeated. In the event that the performance feature is still not at an acceptable level after an adjustment, at 50 the controller 30 attempts another adjustment by making a further adjustment to any operation parameters that have already been adjusted, making an adjustment to at least one other of the identified operation parameters, or a combination of these. The steps represented at 48 and 50 may be repeated a number of times until a satisfactory result is achieved or a predetermined limit on automatic adjustments has been reached (e.g., a timer expires or a predetermined maximum number of possible adjustments).

In the event that the problem cannot be corrected using the adaptive powertrain control strategy, an indication is provided to the driver that the vehicle should be serviced to address the situation.

For illustration purposes, consider a vehicle exhaust emissions fault that involves a level of discharge from the vehicle that exceeds a regulation on such emissions. The controller 30 may determine that this condition exists using known sensor information that is indicative of the composition of the exhaust. The controller 30 is configured to use a predetermined relationship between powertrain operation parameters and performance features to identify operation parameters that are candidates for an adjustment to attempt to correct the situation. In one example, the predetermined relationship is based upon or represented by a mathematical model that corresponds to the influence that each operation parameter has on each performance feature. In one particular example, the performance features are considered response surfaces and a known mathematical optimization tool is used to represent the influence of the operation parameters on the response surfaces. For example, known mathematical optimization tools and techniques are useful for finding the maximum or minimum values of multidimensional surfaces within imposed constraints. Such an optimization is performed by the controller 30 in some embodiments for determining adjustments to one or more operation parameters to effect a change in a performance feature of concern.

In another example, the relationship between a performance feature and operational parameters is determined based on empirical data. For example, some embodiments of the controller 30 will be configured with a data set corresponding to relationships among various performance features and various operation parameters. Those empirical-data-based relationships provide information to the controller for deciding which one or more of the operation parameters to adjust to attempt to correct a performance feature that is out of a desired or acceptable range.

Table 1 contains example performance features and operation parameters that would be useful in some embodiments. Table 1 is only a partial representation of the type of powertrain data that would be available to the controller for some vehicles.

Performance features are listed in the first column in Table 1, such as nitrogen oxides emissions (NOx), fuel economy (FUEL ECON), and selective catalytic reduction conversion efficiency (SCR EFF). Operation parameters are listed in the first row, such as high pressure exhaust gas recirculation (HP EGR), low pressure exhaust gas recirculation (LP EGR), charge temperature (CHARGE TEMP), variable valve timing (VARVALVE TIMING), urea dosing or consumption (UREA DOS/CON), fuel rail pressure (RAIL PRESSURE), and low pressure exhaust gas recirculation throttle (LP EGR THROTTLE).

In this example each of the operation parameters that has a relationship with the performance feature includes an indication in the corresponding row beneath that operation parameter. For example, the high pressure exhaust gas recirculation operation parameter has a relationship to the nitrogen oxides emissions and the fuel economy but not the selective catalytic reduction conversion efficiency. A cost function is used to evaluate an influence that each operation parameter has on each performance feature. A higher cost indicates a greater influence in some embodiments. In Table 1, an X indicates a relatively high influence and an E indicates a relatively low influence. An operation parameter with an X may impact the performance feature directly and an adjustment to such an operation parameter alone may make a significant change in the performance feature. An operation parameter with an E in Table 1 is considered an enabling parameter but would only impact the performance feature if that operation parameter were adjusted in combination with an adjustment to at least one other operation parameter.

The controller 30 in some embodiments is configured to determine a level of influence of each operation parameter and to prioritize adjustments based on the relative influences. The operation parameter with the highest influence is adjusted first in some examples when attempting to correct a particular performance feature.

Figure 3:
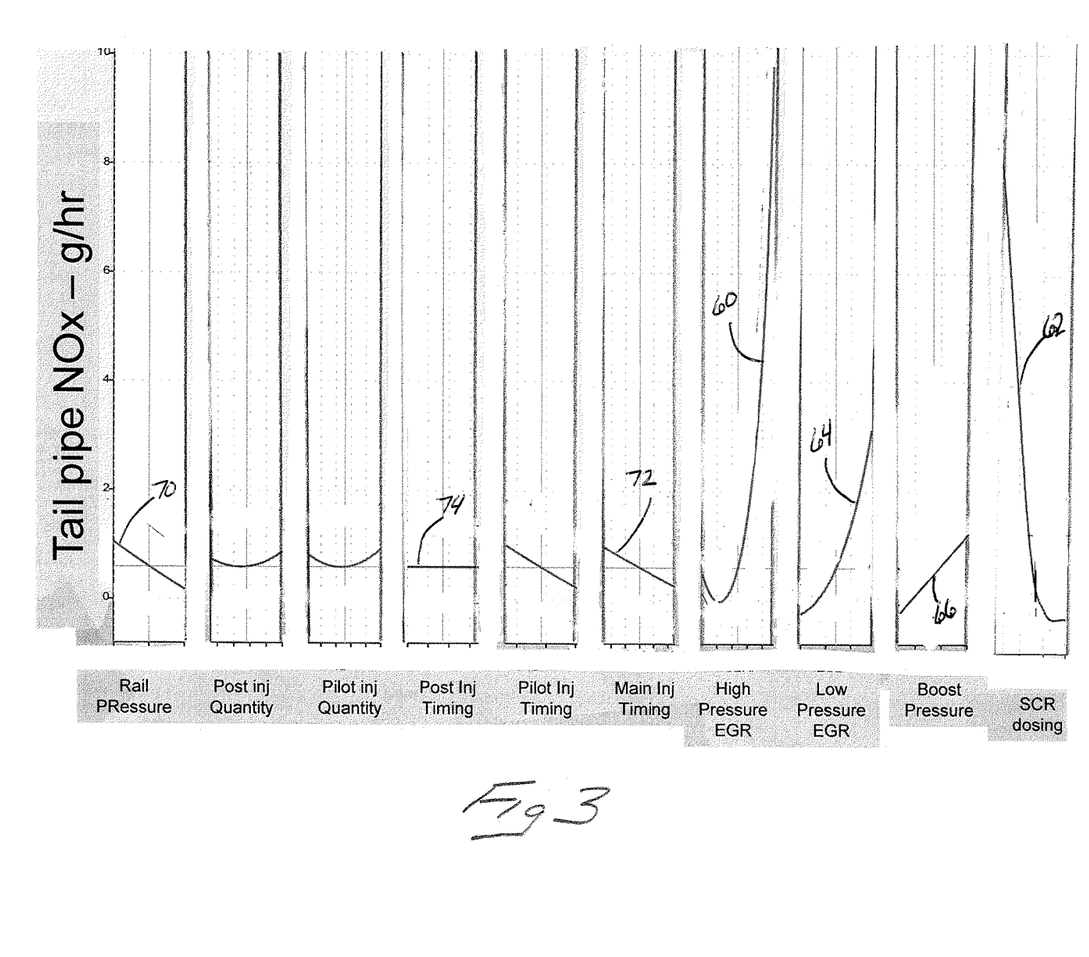
FIG. 3 graphically illustrates the respective influences a plurality of operation parameters may have on a vehicle performance feature, such as nitrogen oxidess emissions.

FIG. 3 is a graphical representation of the relative effect of different operation parameters on the nitrogen oxides emissions performance feature. The more significant (i.e., higher) values shown in FIG. 3 correspond to a more significant influence. For example, the curve at 60 corresponds to the effect that High Pressure EGR has and the curve 62 corresponds to the effect of SCR dosing. In this example, those two operation parameters have the most significant effect followed by the Low Pressure EGR, which is represented by the curve 64, and the boost pressure, which is represented by the curve 66. The rail pressure and main injection timing operation parameters have a less significant effect as indicated by the lower values on the curves 70 and 72. The flat curve 74 indicates that the post injection timing has essentially no effect on the nitrogen oxides performance feature.

The controller 30 may use a look up table containing information as represented in Table 1 above or FIG. 3, depending on the particular configuration and the manner in

TABLE 1

|  | HP EGR | LP EGR | CHARGE TEMP | VARVALVE TIMING | UREA DOS/CON | RAIL PRESSURE | LP EGR THROTTLE |
|---|---|---|---|---|---|---|---|
| NOx | X | X | X | X | X | E | E |
| FUEL ECON | X | X | X | X | E | X | E |
| SCR EFF |  |  |  |  | X |  |  | which data is provided to the controller 30. Those skilled in the art who have the benefit of this description will realize what data format will meet their particular needs.

Consider an unacceptable nitrogen oxides emission level for example. The controller 30 uses predetermined information like that shown in Table 1, FIG. 3, or both to identify the operation parameters that influence the nitrogen oxides emissions. The controller 30 implements an adjustment of at least one of the HP EGR, LP EGR, CHARGE TEMP, VARVALVE TIMING, UREA DOS/CON and the RAIL PRESSURE based on the information in Table 1. If that adjustment corrects the problem then the vehicle may continue operating without violating the applicable emission standard. If a first adjustment is not sufficient, the controller may adjust one or more of the operation parameters using a series of adjustments until a satisfactory nitrogen oxides level is realized.

Assume for the sake of discussion that the aberrant nitrogen oxides level is due to a failure of the actuator that is associated with the high pressure exhaust gas recirculation. That operation parameter cannot be adjusted. The controller 30 identifies such a failed actuator (using a known technique) when diagnosing the nitrogen oxides emission problem. In embodiments that include a mathematical model to represent the relationships among the performance features and the operation parameters, the controller 30 determines a value that represents the current state of the failed or malfunctioning actuator. The value of the corresponding operation parameter (HP EGR) is set to a fixed value corresponding to that which represents that actuator's current state in the mathematical model. The controller 30 can adjust any others of the operation parameters as discussed above to attempt to correct the nitrogen oxides emission level while ensuring that other emission requirements are satisfied.

Taking the data from FIG. 3 into account, the controller 30 in one example identifies the operation parameter that has the most significant effect on the nitrogen oxides emission performance feature and attempts to correct the situation with an adjustment of at least that operation parameter. In the case of FIG. 3, the SCR dosing or the High Pressure EGR have the most significant effect and the controller 30 begins with an adjustment to at least one of those. Other operation parameters may also be adjusted to obtain the desired result as described above.

Figure 4:
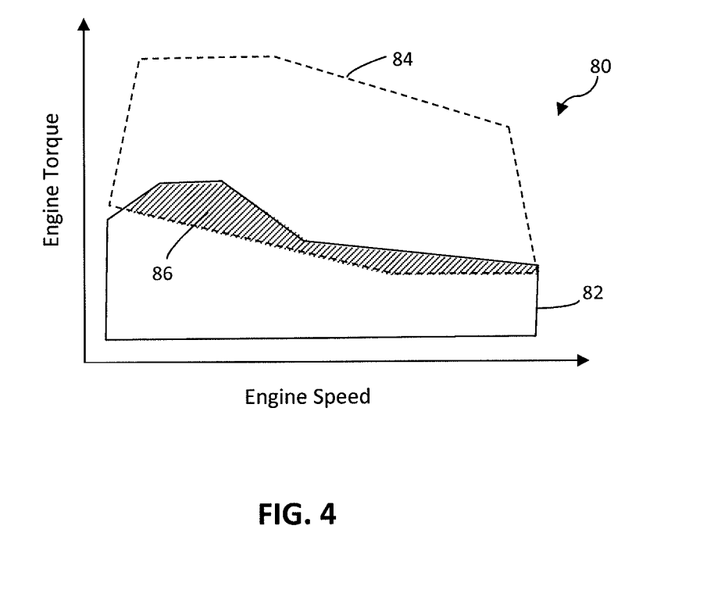
FIG. 4 graphically illustrates an aspect of selecting an operation parameter for adjustment for enhancing a performance feature.

In some examples, the controller 30 is programmed or provided with information so that the controller 30 may select between multiple possible operation parameters that could be adjusted, depending on the current vehicle operation conditions. FIG. 4 schematically shows how two different operation parameters may be a better first choice to effect a change in a given performance feature depending on the current vehicle operation conditions. The plot 80 in FIG. 4 represents a relationship between engine speed and engine torque. When values of engine speed and engine torque are within a first region 82, it would be more effective to adjust the High Pressure EGR. When the operating conditions are within a second region 84, it would be more effective to adjust the Low Pressure EGR. In some cases, such as that shown in FIG. 4, there is an overlap region shown at 86 where either of the operation parameters may be adjusted to bring an aberrant performance feature in line with a desired or acceptable range. The controller 30 in some examples uses information such that as that shown in FIG. 4 for determining which operation parameter to adjust in a particular situation.

Figure 5:
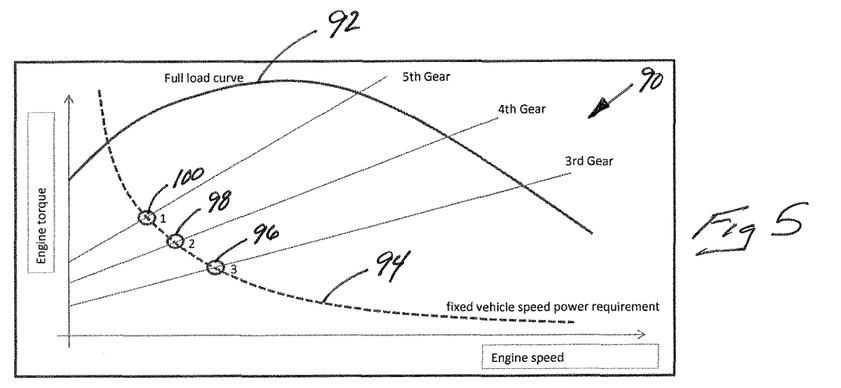
FIG. 5 graphically illustrates an aspect of adjusting a transmission shift schedule operation parameter for enhancing a performance feature in a first type of vehicle.

FIG. 5 includes a plot of an example relationship between engine torque and engine speed. A curve 92 represents a full load curve and a curve 94 represents a vehicle speed power requirement, such as a 5 kW power requirement for a vehicle speed of 50 kph, which can be considered a fixed power demand for cruise conditions. The vehicle engine can develop that power at a number of speed load conditions, which are dictated by the gear ratios of the transmission. The circles at 96, 98 and 100 represent where the desired power might be achieved in each of third, fourth and fifth gears, respectively. If there were an improperly performing actuator and fuel efficiency is a performance feature of interest, it may be useful to choose the highest gear for a given speed load condition to enable the lowest engine speed and lowest associated frictional losses to achieve the highest fuel efficiency. Another effect of changing the engine operating point, however, is that the strength of the control parameter relationships on pollutants change, such as a change in the relationships between gradients of the NOx and operation parameters. One example embodiment includes choosing one of the three presented optimization opportunities by determining the best compromise at one of the circles 96, 98, or 100. This demonstrates how selecting the gear for a particular operating condition may impact performance features other than one of primary concern (at that particular instance).

Figure 6:
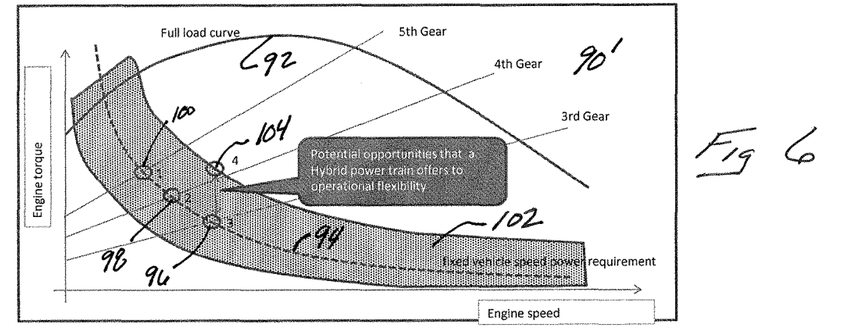
FIG. 6 graphically illustrates an aspect of adjusting a transmission shift schedule operation parameter for enhancing a performance feature in a second type of vehicle.

FIG. 6 shows a plot 90' that resembles the plot 90 of FIG. 5 to illustrate further opportunities to select different operation parameters. In this example, the range schematically shown at 102 indicates how different loads may be imposed on the internal combustion engine in a hybrid vehicle compared to the possibilities presented with a non-hybrid vehicle. The presence of the electric motor(s) of the hybrid vehicle effectively widens the range of possibilities from the line at 94 to the range at 102.

For example, the electric motor(s) of the hybrid vehicle may provide additional power to achieve the desired power needed for the current driving conditions. The circle 104 shows a possible set of operation parameters that provides the same power output with the electric motor contributing toward the total as the output power provided at 96 when the combustion engine is the sole source of power. In hybrid vehicle embodiments, the controller may select various engine operation parameters, which introduces additional trade-off relationships for a condition in which an overall powertrain objective is achievable even when one or more operation parameters is not in a desired range.

Figure 7:
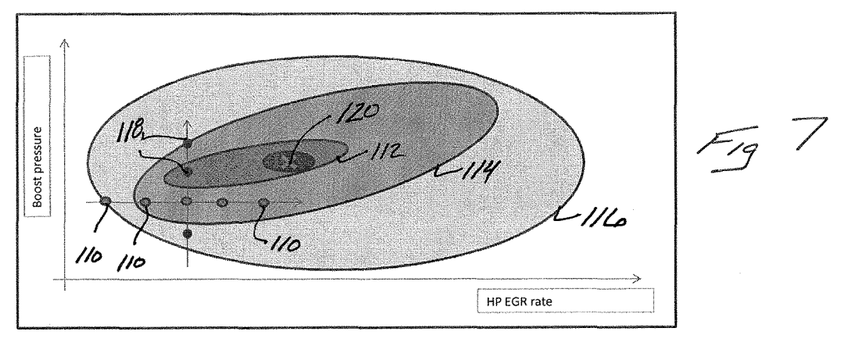
FIG. 7 graphically illustrates an aspect of adjusting a plurality of operation parameters for enhancing a performance feature of a vehicle.

FIG. 7 schematically represents a relationship between a vehicle response versus engine boost pressure and HP EGR rate. If the HP EGR rate is the operation parameter that has the most significant effect on the performance feature of interest then the controller may select one of the options represented by the HP EGR operation parameter values at 110. Changing the HP EGR value (e.g., moving from left to right in the illustration) results in an improved response signified by the different iso response surfaces 112, 114 and 116, which are schematically shown in the background. Eventually the iso response plateaus or even worsens. The controller 30 in this example optimizes the conditions by reverting back to a more favorable HP EGR value.

Further adjustments may be made, such as changing the boost pressure to the values shown at 118. The values shown at 120 may be the optimum result. The controller is programmed in some examples to use a global optimization approach that searches the response surface for the optimum result rather than adjusting one operation parameter at a time and in a linear, sequential order. In some situations adjusting a single operation parameter may provide the optimum result so the global optimum search approach may include adjusting a single operation parameter under some circumstances.

One aspect of the adaptive control technique used by the example controller 30 is that it allows for various control systems and actuator parameters to adaptively adjust to a problem with another actuator for addressing a problematic performance feature. This takes advantage of the various ways in which different operation parameters may be adjusted so that vehicle operation may continue instead of providing an indication that the vehicle needs to be brought in for service to address the problem. The disclosed adaptive control strategy minimizes inconvenience to a vehicle owner by making strategic use of related powertrain operation parameters to keep the various performance features associated with powertrain operation within desired or acceptable ranges.

In the preceding description some example actuators or functional components are mentioned for discussion purposes. Those skilled in the art will realize how other actuators would be relevant to a consideration of a circumstance that is different than that described above and how the disclosed adaptive control techniques will be useful to address other situations in which one or more performance features are not within an acceptable or desired range.

While various features and aspects are described above in connection with one or more particular embodiments, those features and aspects are not necessarily exclusive to the corresponding embodiment. The disclosed features and aspects may be combined in other ways than those specifically mentioned above. In other words, any feature of one embodiment may be included with or substituted for a feature of another embodiment.

The preceding description is illustrative rather than limiting in nature. Variations and modifications to the disclosed examples may become apparent to those skilled in the art that do not necessarily depart from the essence of the contribution to the art provided by the disclosed examples. The scope of legal protection provided to the invention can only be determined by studying the following claims.

We claim:

1. A method of controlling a vehicle powertrain, the method comprising:
   performing the following steps within a controller of the vehicle powertrain:
   determining that a performance feature associated with the powertrain is outside of a desired performance range;
   identifying a plurality of operation parameters associated with the powertrain having a relationship to the performance feature;
   determining an influence that each identified operation parameter has on the performance feature;
   prioritizing adjusting one of the identified operation parameters having a first influence over another identified operation parameter with a second, lower influence; and
   automatically adjusting at least one of the identified operation parameters by adjusting the operation of an actuator or component of the vehicle powertrain that is associated with the at least one identified operation parameter to thereby bring the performance feature closer to the desired performance range.

2. The method of claim 1, comprising
   automatically adjusting at least the operation parameter with the highest influence.

3. The method of claim 2, comprising
   determining whether a first adjustment to the operation parameter with the highest influence results in the performance feature returning to the desired performance range; and
   automatically making a second adjustment to the operation parameter with the highest influence if the performance feature is still outside the desired performance range; or
   automatically adjusting at least one other of the identified operation parameters that is selected according to the prioritizing if the performance feature is still outside the desired performance range.

4. The method of claim 1, wherein the automatically adjusting comprises
   implementing an adjustment to at least one of the operation parameters; and
   determining whether the adjustment causes the performance feature to be within the desired performance range.

5. The method of claim 4, comprising
   repeatedly implementing another, different adjustment to at least one of the operation parameters if a most recent adjustment does not cause the performance feature to be within the desired performance range.

6. The method of claim 1, wherein the relationship comprises a mathematical model that corresponds to how the operation parameters influence whether the performance feature is within the desired performance range.

7. The method of claim 6, comprising
   identifying an actuator failure associated with the powertrain;
   determining at least one of the operation parameters corresponding to the actuator failure;
   determining a value of the corresponding operation parameter that is indicative of the actuator failure; and
   using the determined value as a fixed value for the corresponding operation parameter in the mathematical model.

8. The method of claim 7, wherein the automatically adjusting at least one of the identified operation parameters comprises changing a value of the at least one of the operation parameters in the mathematical model until the performance feature value of the mathematical model is within the desired performance range.

9. A system, comprising:
   a controller configured to:
   determine that a performance feature associated with a vehicle powertrain is outside of a desired performance range;
   identify a plurality of operation parameters associated with the powertrain having a relationship to the performance feature;
   determine an influence that each identified operation parameter has on the performance feature;
   prioritize adjusting one of the identified operation parameters having a first influence over another identified operation parameter with a second, lower influence; and
   automatically adjust at least one of the identified operation parameters by adjusting the operation of an actuator or component of the vehicle powertrain associated with the at least one identified operation parameter to thereby bring the performance feature closer to the desired performance range.

10. The system of claim 9, wherein the controller is configured to transmit a signal to cause at least the operation parameter with the highest influence to be automatically adjusted.

11. The system of claim 10, wherein the controller is configured to determine whether a first adjustment to the operation parameter with the highest influence results in the performance feature returning to the desired performance range; and transmit a second signal to cause a second adjustment to the operation parameter with the highest influence to be made automatically if the performance feature is still outside the desired performance range; or transmit a third signal to cause at least one other of the identified operation parameters that is selected according to the prioritizing to be made automatically if the performance feature is still outside the desired performance range.

12. The system of claim 9, wherein the controller is configured to automatically adjust the at least one of the identified operation parameters by causing an adjustment to at least one of the operation parameters to be made; and determining whether the adjustment causes the performance feature to be within the desired performance range.

13. The system of claim 12, wherein the controller is configured to repeatedly cause another, different adjustment to at least one of the operation parameters, to be made until the performance feature is within the desired performance range.

14. The system of claim 9, wherein the relationship comprises a mathematical model that corresponds to how the operation parameters influence whether the performance feature is within the desired performance range.

15. The system of claim 14, wherein the controller is configured to identify an actuator failure associated with the powertrain;

determine at least one of the operation parameters corresponding to the actuator failure;

determine a value of the corresponding operation parameter that is indicative of the actuator failure; and use the determined value as a fixed value for the corresponding operation parameter in the mathematical model.

16. The system of claim 15, wherein the controller is configured to automatically adjust at least one of the identified operation parameters by changing a value of the at least one of the operation parameters in the mathematical model until the performance feature value of the mathematical model is within the desired performance range.

17. A vehicle comprising the system of claim 9.

* * * * *